United States Patent [19]
Gibbs

[11] 4,085,734
[45] Apr. 25, 1978

[54] SOLAR HEATERS

[76] Inventor: Norman S. Gibbs, Rte. 1, Box 176, Loveland, Colo. 80537

[21] Appl. No.: 721,097

[22] Filed: Sep. 7, 1976

[51] Int. Cl.² .................................... F24J 3/02
[52] U.S. Cl. ......................................... 126/271
[58] Field of Search ............... 126/270, 271; 237/1 A; 165/169, 170, 171

[56] References Cited
U.S. PATENT DOCUMENTS

| | | | |
|---|---|---|---|
| 1,989,999 | 2/1935 | Niederle | 126/271 |
| 2,490,659 | 12/1949 | Snyder | 126/271 |
| 3,916,871 | 11/1975 | Estes et al. | 126/271 |
| 3,987,783 | 10/1976 | Powell | 126/271 |
| 4,010,080 | 3/1977 | Tsay et al. | 126/271 |

*Primary Examiner*—Kenneth W. Sprague
*Assistant Examiner*—James C. Yeung
*Attorney, Agent, or Firm*—Wilbur A. E. Mitchell

[57] ABSTRACT

A Solar Heat Collector unit having a series of parallel convex metal heat collector interconnected liquid channels, a series of transparent domes in sealed and spaced parallel relationship thereover, and an air suction pump connected with the dome for taking the air from under the dome for creating a vacuum in the space between the dome and the heat collector channel for thereby preventing air convection and conduction within that space and thus preventing loss of solar heat from that space.

3 Claims, 7 Drawing Figures

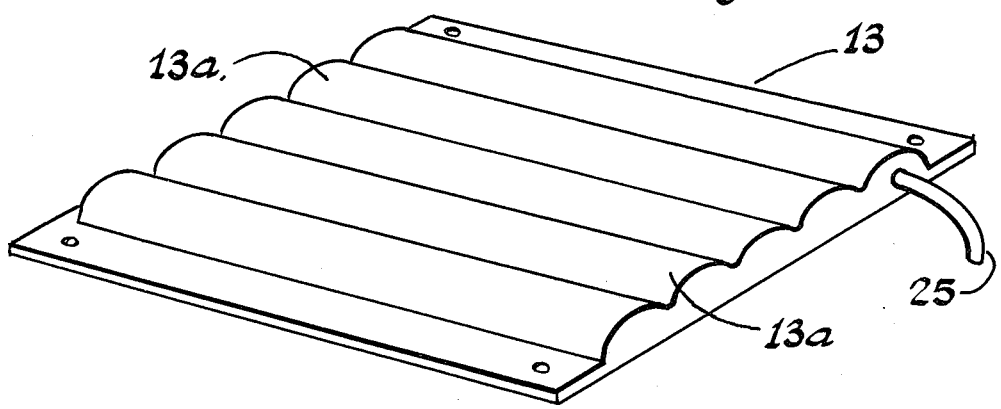
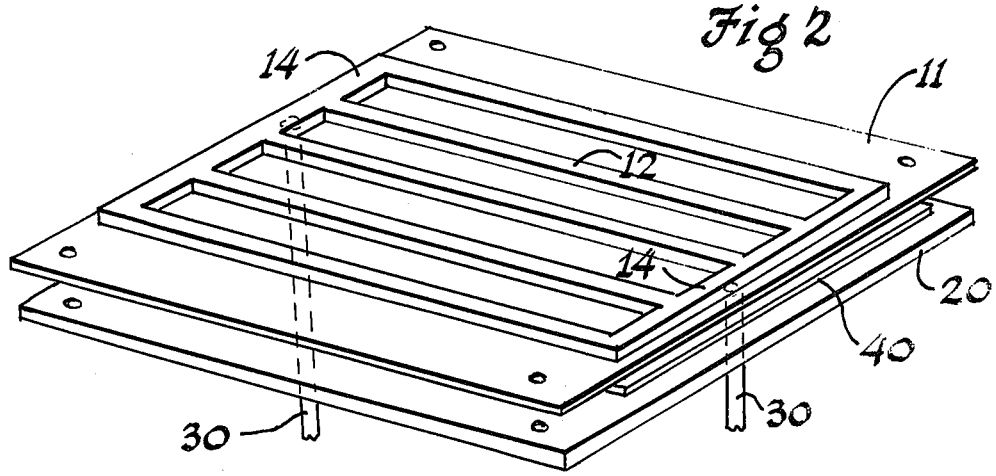
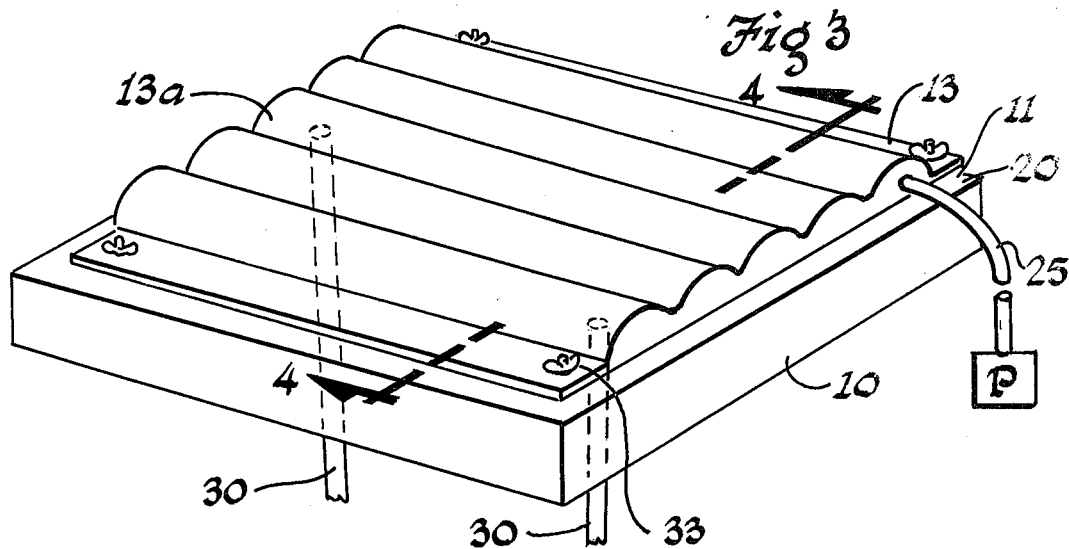

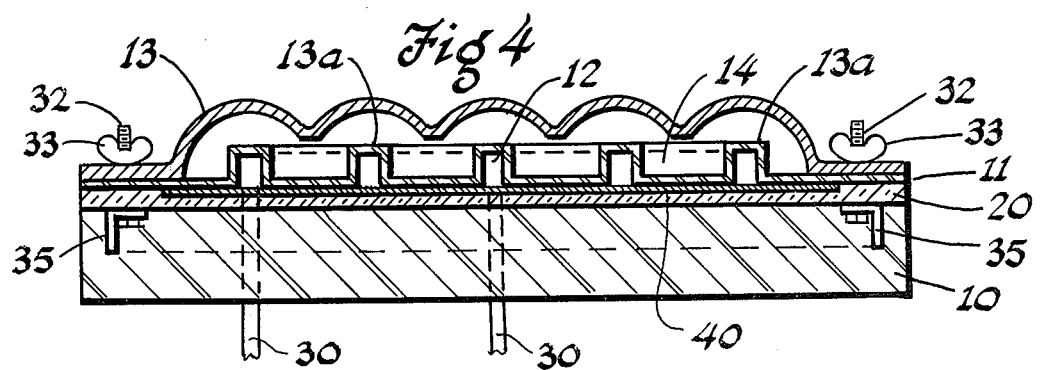
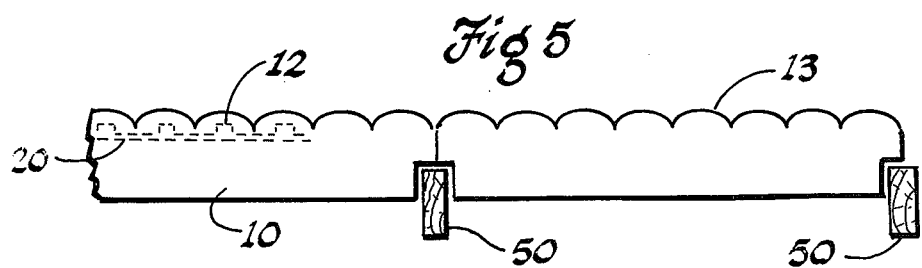
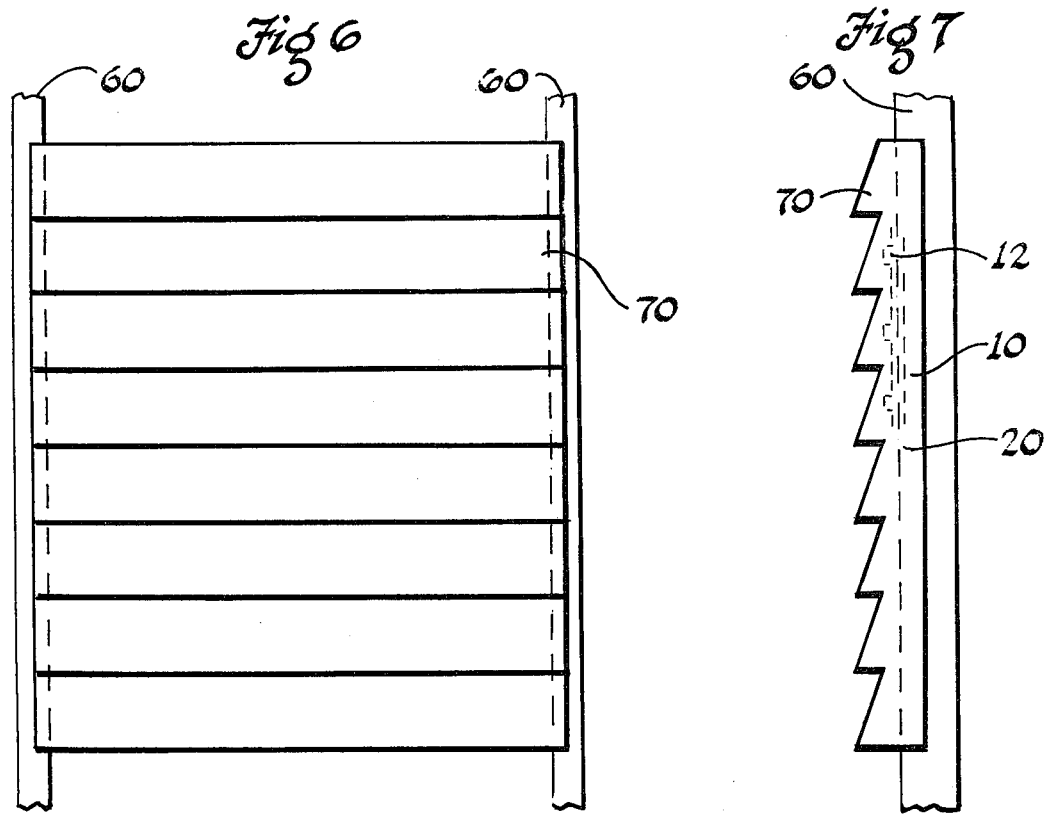

SOLAR HEATERS

This invention relates to new and useful improvements in Solar Heat Collectors, and more particularly to the type for heating liquid, for the many uses thereof, and though herein illustrated as used with frame buildings, it is not necessarily to be limited thereto.

Present solar heaters, so far as known, result in the loss of considerable solar heat, in the process of the use of the heaters, due to there being air convection or conduction occurring within the solar heat collector units, among others. Such air convection movement occurs within the collectors and causes in affect, a bouncing-off of the solar heat with resultant loss thereof before the heat can be sufficiently collected and utilized, on the solar rays striking the unit part thereof to be heated.

Further heretofore, as far as known, the liquid in the unit to be heated has been held in depressed or concave liquid channels or tubes and with channels or tubes heated by a substantially flat heater plate or surface, resulting in the loss of solar heat by that construction. As a result, present solar heaters have not been satisfactory.

The problem has been recognized heretofore, but there has been unsuccessful effort to cope therewith, so far as known, among others, by the provision in one instance of a dead air space in a unit over the heat collector or absorber channel. However, same has not accomplished the desired result, as that dead air space has amounted, in affect, as if same was a flat plate, which permitted the solar rays to bounce against same. As the rays hit that dead air space they bounced away, as a result of the air conductivity of that dead air space, and too much of the solar heat was lost by that air conductivity of the dead air space. The air conductivity occurred whether the air space was dead air or alive air.

After much experimentation and testing, applicant has discovered and developed a novel solar heat collector unit having a sealed vacuum space between his heat absorber channel means and his transparent plastic or glass dome means which covers those channels, and which vacuum in that space between those two thus prevents any loss of the solar heat therein by theretofore air conductivity or convection. Thereby the solar heat is fully substantially captured by applicant's heat absorber channels under the dome without the solar heat being lost, as there can be no bouncing off of the solar heat as the heat rays strike against his heat collector channel means, as there is no air in the space between the dome and the absorber channels so there can be no air conductivity and thus there is no air conductivity solar heat loss.

Accordingly, the primary object of the present invention is the provision of a solar heater unit which eliminates the loss of solar heat by wasteful air conduction within the unit, during that solar heat striking the heat absorber-exchanger collector of the unit, by eliminating air conduction within the unit, by providing a vacuum in the unit over the collector.

Another object of the invention is the provision of a novel heat absorber member as of the heat exchanger or collector, which is a raised series of parallel substantially convex channels, thus making a greater exposed surface within a given area capable of being blasted with the solar ray and thereby more of the solar ray can be absorbed by that channel.

Other and further objects will be apparent from the following detailed description of the construction and operation of the invention, reference being had to the accompanying drawings, in which:

FIG. 1 is a perspective view of a preferred embodiment of the transparent rectangular single transparent member 13 of my solar collector unit.

FIG. 2 is a partially exploded perspective view of the parts of my unit, being of my single rectangular heat exchanger plate 11, of the same size as the dome 13, and of the washer element 40 thereunder, and the plastic backing sheet seal member 20.

FIG. 3 is a perspective view of my completely assembled solar heat collector unit.

FIG. 4 is a cross-sectional view taken on the line 4—4 of FIG. 3.

FIG. 5 is a reduced diagrammatic view illustrative cross-sectionally of the use of two of my heat collector units as roof sheeting between a pair of roof joists on the roof of a frame dwelling house.

FIG. 6 is a diagrammatic schematic face view of a modification of my unit, adapted for use with vertical studs of a frame dwelling house, showing how same is used in place of conventional sheeting, such as celotex; and FIG. 7 is a side view of the modification of my unit as shown in FIG. 6.

Referring now to the drawings in detail, it will be seen that the preferred embodiment of my invention, shown in FIGS. 1-5, comprises a styrofoam plastic heat insulation base member 10, of relatively thick slabbed rectangular shape and portion, of suitable dimension. A like rectangular suitable waterproof backing sheet 20 is sealed onto that base 10, and which completely covers and seals the base 10. A peripheral rectangular washer 40 is placed onto the seal sheet 20 as shown, for reason to be explained.

A novel heat exchanger or absorber plate 11 is then provided, of substantially the same rectangular shape in overall area as the base 10 and sheet 20, and of the configuration shown, but with the surface thereof opposite from the base formed as a series of parallel convex channels 12. Said channels 12 are interconnected together at each of their ends by a distribution channel 14. Parallel channels 12 and the distribution channels 14 at each ends are sealed, with relation to the plastic sheet 20, as shown. The heat absorber or exchanger plate 11 is designed as one piece, of the configuration illustrated in FIG. 2 and as shown in FIG. 4, and its channels 12 and 14 thus comprise liquid receiving ducts or channels. Several connecting pipes 30 stem from the side channels 14 to a reservoir, not illustrated, for reason of inlet and discharge of liquid from 12 and 14 thereby, as obviously, liquid held within the channels 12 and 14 may be thermal or pump circulated through the said channels as the liquid therein is solar heated.

Completion of the assembly of this unit is by placement of the illustrated one piece transparent plastic convex domes unit 13, of the design illustrated and shown in FIGS. 1, 3 and 4, over the base 10 and sheet 20 and over the heat exchange of solar plate 11. Unit thirteen comprises a transparent cover series of those convex domes in parallel relationship spacedly over the convex channels 12, and supported on side walls as shown in FIG. 4. Thus unit 13 resists outer air pressure. That dome is then secured in place and the entire unit secured together by the four screw-bolts 32 at each corner of the unit, and wing-screw nut 33 thereon, as illustrated in FIG. 4. When the wing nuts are screwed down tightly on their respective bolts as shown and extending through the various unit's parts as mentioned and as shown, the wing nuts will draw down the top of the dome 13 collar, and the head of the bolt and the bottom of the angle iron frame will act to draw and hold the heat exchanger plate each sealed tightly together. The washer 40 between 20 and 11, thus thereby assists them in sealing the liquid in the channels 12 and 14 and thus the liquid in the pipes 30 and the reservoir to which pipes are connected. It will be seen that said construction seals the dome 13, when the wing nuts and screw bolts are secured together tightly as just explained, tightly onto the heat absorber plate 11 so that no air can enter or leave the space under that dome 13 of the unit when the screw bolts 32-33 are tightly secured down in place. The liquid in 12 and 14 when water is used, has such as Prestone or Zerex therein, for example, which is used as a suitable antifreeze so that when the unit is used in freezing temperature to prevent a freezing of the liquid. However, other liquid than water may be used.

To prevent the loss of solar heat of the solar rays striking through transparent dome 13 onto channel plate 11, as first explained in this application, by air conductivity within the underside of the dome 13, the air within the underside of the dome 13 and between that dome and the upper sides of the heat exchanger channel member 11, is removed therefrom. Air convection or conductivity causes the loss of that heat. Therefore, air within that space is removed to prevent air conductivity and thus the solar heat is prevented from bouncing off the outside of the channels 12 under that dome. By that air within that space being removed there can be no air conductivity or convection. To accomplish that air removal, an air tight tube 25 extends from a side of dome 13 and leads to a suitable air suction pump, shown as P. That pump is operated sufficiently to maintain a suitable suction within 13 for thereby maintaining a suitable vacuum in the space between the outside or upper surfaces of channels 12 and 14, as illustrated, and the undersides of the domes 13. Thus, with that vacuum in that space between 12 and 14 on the one hand and the dome 13 on the other hand, there can be no air convention or conductivity possible there, and thus because of no air conductivity or convection there can be no solar heat loss as a result of any such air conduction or convection in the unit in that space. It will be understood that a vacuum may be created in the space between 13 and the channels 12-14 on unit sealed assembly, by suitable conventional means, in addition.

From the foregoing, the operation of the heater will be readily understood. The liquid enters the unit through one of the connections 30. It being understood that said liquid is confined within the horizontal metal convex channels 12 and 14, as illustrated in this embodiment FIGS. 1-5. That heat exchanger plate 11 and its channels 12-14 are preferrable made of copper or such suitable heat receptive and conductive material, for efficiency, so as to absorb the solar heat hitting the exterior surfaces thereof. The solar rays hitting the surfaces of 12 and 14, after penetrating the transparent domes 13 and striking those metal channels 12 and 14, transmit their heat fully onto those channels 12 and 14 without any heat loss caused by any air convection or conduction, between the channels 12 and 14 on the one hand and the underside of the domes 13 on the other hand, because their is no air within that space between 12 and 14 on the one hand and the domes 13 on the other hand. There being no air there, there can be no convection or conduction. That is because there is always a vacuum maintained in that space as a result of the suction pump operating to maintain that vacuum in that area through the tubes 25. Applicant, as far as known, is the first to have discovered this improvement in the collection of the solar heat rays. The efficiency of the heat absorption is obvious, the liquid being heated by the solar rays striking the said channels 12 and 14. The plastic backing seal sheet 20 is of a black color. Heat loss is also insulated against by the base 10 being a thick styrofoam insulating feature, as same is a highly insulative agent against heat transmission. The result is that the solar heat is absorbed and taken off by the liquid within the channels 12-14, which flows therethrough and into one of the connecting pipes 30 and assisted by a pump, if desired, flowing into the desired reservoir where the heated liquid is utilized for a desired purpose. Domes 13 are purposely to resist outer air pressure.

Referring to FIG. 5, I have diagrammatically illustrated how my units can be placed between roof joists of a building such as a house. The frame 35 extends from joist to joist.

FIGS. 6 and 7 are diagrammatic illustrations of how a modification can be made of the transparent dome 13 cover of my unit, into one simulating siding for a frame home, so that the unit can be mounted as sheeting between upright studding, in lieu of conventional celotex or other siding or sheathing, as will be understood. Otherwise the construction of this modification is the same, as illustrated heretofore, in FIGS. 1-5.

The foregoing is not intended to limit this invention to the exact constructions shown and described, but it is to be understood that many changes and modifications can be made therein by those skilled in the art, and that the foregoing is only to be broadly considered as to the principles of the invention, namely, as to the spirit, intent and teaching thereof; it is to be expressly understood that this invention shall be limited only by the hereunto appended claims, and that suitable modifications and equivilants falling within the scope thereof shall be in order.

What is claimed as new and desired to be secured by letters of patent is:

1. A solar heat collector unit comprising a metal frame, a thick plastic heat insulative material piece formed integral with the frame, a liquid seal sheet means completely covering a side of the insulative material, a single likeshaped metal heat absorber plate means completely covering said seal sheet means and having a plurality of convex formed channels therein with the channels formed on a side thereof opposite from the seal sheet means side and adapted to act as liquid ducts and connected with each other by a convex liquid distribution duct, a single transparent dome member means completely sealingly covering said heat absorber plate means in sealed spaced air relationship thereover, said frame and heat absorber plate means and seal sheet means and dome each having collar means adapted for adjacent abutment so as to be clampingly held thereby together peripherally, a ring washer between the liquid sheet seal means and the heat absorber plate means, a plurality of fastening means extending through the frame and seal sheet means and absorber plate means and dome member and adapted for compressing and holding the collar means of each together in sealed relationship, liquid ducts communicating the interior of said channels with a reservoir, an air tube sealed duct communicating the underside of the transparent member with an air suction pump for providing an air tight connection with the space between the underside of the dome member and the adjacent exterior of said channels with an air suction pump, an operable air suction pump connected with said air tube duct, whereby upon operation the air suction pump a vacuum is created thereby in the scope between the transparent member and the channels of the heat absorber plate means when the fastening means is so sealingly tightened to hold the frame and seal sheet means and metal absorber plate means and dome member sealingly together in tight seal relationship.

2. A solar heat collector unit as defined in preceding claim I and characterized further by the definition of said metal frame being adapted for affixation to a pair of adjacent roof joists or a pair of adjacent studding of a building, as sheathing therebetween.

3. In combination, a solar heat collector unit comprising, an insulated base member, an upstanding convex channel member sealingly held thereon and adapted to receive fluid therein, and a single radiant energy transmitting dome member means sealingly secured to the base member and covering said upstanding channel member in spaced and parallel sealed relationship thereover, said channel member comprising a heat absorber means and having a conduit connection therefrom to a heat storage reservoir, a sealed air conduit connecting the dome means and above said channel heat absorber means to an air suction pump means, and an air suction pump connected to said conduit, whereby upon operation of said pump means an air vacuum is created within the space between said dome member means and said heat absorber channel means.

* * * * *

UNITED STATES PATENT OFFICE
CERTIFICATE OF CORRECTION

Patent No. 4,085,734   Dated April 25, 1978

Inventor(s) Norman S. Gibbs

It is certified that error appears in the above-identified patent and that said Letters Patent are hereby corrected as shown below:

On the title page, the address of the inventor should read -- Route 4, Box 297, Montrose, Colorado --.

Column 3, line 28, the comma should be deleted.

Column 4, line 5, "tubes" should read -- tube --.

Column 5, line 8, "scope" should read -- space --.

IN THE DRAWINGS:

In Fig. 4, the lead lines from the numerals "13a" should be shortened to terminate at the convex domes of element 13 --.

Signed and Sealed this

Twenty-fourth Day of October 1978

[SEAL]

Attest:

RUTH C. MASON
Attesting Officer

DONALD W. BANNER
Commissioner of Patents and Trademarks